(12) United States Patent
Nacht (10) Patent No.: US 7,478,064 B1
(45) Date of Patent: Jan. 13, 2009

(54) SYSTEM AND PROCESS FOR APPLYING FOR AND OBTAINING UNIVERSAL MULTIPLE MORTGAGE UNDERWRITING APPROVALS

(76) Inventor: Richard H. Nacht, 31 Revere Ct., Princeton Junction, NJ (US) 08550

( * ) Notice: Subject to any disclaimer, the term of this patent is extended or adjusted under 35 U.S.C. 154(b) by 568 days.

(21) Appl. No.: 09/667,694

(22) Filed: Sep. 22, 2000

(51) Int. Cl.
*G06Q 40/00* (2006.01)

(52) U.S. Cl. .......................... 705/38; 705/35

(58) Field of Classification Search .......... 705/35, 705/38
See application file for complete search history.

(56) References Cited

U.S. PATENT DOCUMENTS

| | | | | |
|---|---|---|---|---|
| 5,239,462 | A | 8/1993 | Jones et al. | 364/408 |
| 5,611,052 | A | 3/1997 | Dykstra et al. | 395/238 |
| 5,878,403 | A | 3/1999 | DeFrancesco et al. | 705/38 |
| 5,913,202 | A | 6/1999 | Motoyama | 705/35 |
| 5,930,776 | A | 7/1999 | Dykstra et al. | 705/38 |
| 5,940,812 | A * | 8/1999 | Tengel et al. | 705/38 |
| 6,611,816 | B2 * | 8/2003 | Lebda et al. | 705/38 |
| 2002/0013711 | A1 * | 1/2002 | Ahuja et al. | |
| 2002/0059137 | A1 * | 5/2002 | Freeman et al. | |
| 2002/0077970 | A1 * | 6/2002 | Lebda et al. | |
| 2005/0197953 | A1 * | 9/2005 | Broadbent et al. | 705/38 |

OTHER PUBLICATIONS

U.S. Appl. No. 60/197,773, Ahuja et al, filed Apr. 14, 2000.*
U.S. Appl. No. 60/214,767, Freeman et al, filed Jun. 27, 2000.*
U.S. Appl. No. 60/189,635.*
www.overturecorp.com.*
O'Sullivan, Orla. "Automated Underwriting Targets the Branch". US Banker. New York: Aug. 1998. vol. 108, ISsue 8; p. 48, 4 pgs.*
PR Newswire. "FiNet.com and Ellie Mae Combine Technologies to Empower Mortgage Originators". New York: Jun. 27, 2000. p. 1.*
Business Editors. "Fannie Mae and FiNet Holdings Win 1998 Computerworld Smithsonian Award". Business Wire. New York: Jun. 9, 1998. p. 1.*
"New Internet Mortgage Lender Beats E-loan and Quicken Mortgage to Market with Industry's First Instant On-Line Approval". PR Newswire. New York: Mar. 29, 1999. p. 1.*
"AskCredit.com Offers Breakthrough Automated Loan Underwriting Service". PR Newswire. New York: Aug. 22, 2000. p. 1.*
"YapStone Chooses Lending Tree's Unique Online Financing Solution for the Internet Automotive Market". PR Newswire. New York: Jul. 10, 2000 p. 1.*

(Continued)

*Primary Examiner*—Lalita M Hamilton
(74) *Attorney, Agent, or Firm*—Hunton & Williams LLP (57) ABSTRACT

The present invention provides a system and process for a borrower to obtain a multiple mortgage underwriting approval. Using a borrower device connected to a network, a borrower provides mortgage approval application data to a central controller. Mortgage applications are created based on the mortgage approval application data, and then sent to a plurality of underwriting systems. Responses from the underwriting systems are gathered, and forwarded to the borrower. Using the mortgage approval application decisions, the borrower may select which mortgage loan program meets that borrower's needs, and forward the information on to a mortgage lender.

20 Claims, 6 Drawing Sheets

OTHER PUBLICATIONS

"*Why Get Pre-Approved With HomeAdvisor?*" website @ https://homeadvisor.msn.com/financing/finder/overview_preapprove.asp, Jun. 5, 2000, 2 pages.

"*HomeAdvisor—Find Homes and Loans*," homepage @ http://homeadvisor.msn.com, Jun. 5, 2000, 2 pages.

\* cited by examiner

Mortgage Approval Questionnaire

Name
Address
S. S. N.
Employer
Name
Address
Position
Years Held

Previous Name
Previous Address
Previous Employer
Name
Address
Position
Years Held Next >

Mortgage Approval Questionnaire

Down Payment

Loan Amount Range
From
To

Income
Salary
Other Income

Bank Accounts
Checking
Savings
Other

Credit Cards
VISA
MasterCard
American Express
Other

< Back
Next >

FIG. 2B

Mortgage Application Decision Information

Congratulations! You have been approved by the following underwriters:

Underwriter #1

☐ One Year ARM    Terms and Conditions

☐ Five Year ARM    Mortgage Lender Links

☐ 30 Year Fixed

Underwriter #2

☐ One Year ARM    Terms and Conditions

☐ Five Year ARM    Mortgage Lender Links

☐ 30 Year Fixed

SYSTEM AND PROCESS FOR APPLYING FOR AND OBTAINING UNIVERSAL MULTIPLE MORTGAGE UNDERWRITING APPROVALS

FIELD OF INVENTION

This invention relates to a system and method for mortgage approval, and more particularly to obtaining universal multiple mortgage automated underwriting approvals via an online application.

BACKGROUND OF THE INVENTION

Mortgage lending is a large business, with hundreds of billions of dollars of mortgage loans being made each year. The array of different mortgage loan types or mortgage loan programs is vast, with individual variations that can have major impact on cost. Very few borrowers have the knowledge base to effectively and efficiently evaluate all of the relevant mortgage variables such as rates, points, fees, terms and conditions. Specific borrower circumstances, such as anticipated income fluctuations and expected period of occupancy, are relevant to the decision process, and rarely receive appropriate attention. Applicants often receive advice from mortgage lenders (or "lenders") which have a vested interest that may not be in the borrower's best interest.

There are currently more than 40,000 lenders in the United States including more than 38,000 mortgage brokers who control up to seventy percent (70%) of the residential loans in the country. In addition there are thousands of additional mortgage lenders (or "lenders") such as banks, savings institutions and mortgage bankers. Selecting the best mortgage source once the mortgage decision is made can be a difficult decision. Most borrowers do not effectively survey potential mortgage sources. Most borrowers cannot effectively compare mortgage quotes due to the many terms and conditions which require sophisticated analysis for valid comparison.

As a result, the lender drives the process rather than the borrower, and negotiating with mortgage lenders for the best mortgage loan program may be done from a position of weakness, misinformation and lack of education. Many borrowers do not know what is involved in the credit approval process, and do not understand the use and results of automated underwriting systems. Many borrowers, therefore, cannot take full advantage of the advances in technology that some mortgage lenders are currently using. Further, once an approval is obtained from a lender, a borrower often feels committed to the particular mortgage lender that obtained and issued such approval. Once obtained, a mortgage approval is generally good for only that particular mortgage lender. In order to determine if other, better options are available, the borrower may need to individually contact and apply to many lending institutions at a high cost in terms of time and money. In other words, the mortgage lender appears to own the approval and the price being offered with the mortgage loan, and the borrower may believe that he/she has few options when it comes to selecting and negotiating the best mortgage loan terms. In addition, the borrower is not given the results of the automated underwriting decision, thereby preventing he/she from analyzing the merits and details of the decision made by the automated underwriting system. As an example, while the use of scores generated by Fair, Issacs & Co. ("FICO scores") are widely used in underwriting decisions, and are one of the most important components of automated underwriting engines, the actual FICO scores and an explanation as to what those scores mean are not currently available to borrowers. As is known in the art, FICO scores are generated based on a borrower's payment history, credit available, and other factors.

In addition, borrowers often find themselves bargaining from a position of weakness when bidding on a potential new home as a result of not having a legally binding, fully approved mortgage approval. Sellers may decide to accept a lower or similar offer from another bidder, rather than wait for a borrower to receive full mortgage lender approval.

Lead generation is a major expense category for every lender, and increases the costs to the borrower. Mortgage lenders receive leads from a wide variety of sources, including print, radio and television responses, as well as referrals from current and previous clients and real estate brokers and responses to telephone solicitation and direct mail advertisements. It may be difficult, however, for a mortgage lender to effectively allocate resources for all leads. Not all leads are of equal value, and determining which leads to respond to first and with the most effective marketing tools may be difficult. Further, generating leads may be expensive and inefficient. The time and expense to take, process and obtain a credit decision on a loan application, while improved due to technological advances, may still be a long and expensive process. Once obtained, a mortgage approval is generally good for only that particular mortgage lender. Further, many mortgage lenders still generate data multiple times for a mortgage loan application: once to take the application; again to transmit the application for a credit report; again to transmit the application to a private mortgage insurance underwriter; again to transmit the application to either an automated or live underwriter at an investor or contract underwriter, and again to transmit the data to the final owner of the loan including the government sponsored entities, such as the Federal National Mortgage Association ("Fannie Mae") and the Federal Home Loan Mortgage Corp ("Freddie Mac"). In addition, mortgage lenders may find themselves working with a variety of vendors for mortgage related services in a time consuming and inefficient manner.

A manner of addressing these difficulties is offered by an online lender with limited comparison shopping feature on its mortgage site that compares its own mortgage loans to (only) five other lenders. This feature, however, does not compare among varying mortgage loan programs, nor does it respond with approvals from the list of searched lenders and as noted is very limited in the number of lenders it compares.

Several rate and information aggregator websites have been proposed or are in existence purporting to provide borrowers with an unbiased choice and wide selection of financial products. Some of these sites suffer from the drawback of allowing for only a pre-qualification and only from a limited number of lenders. These lenders pay by advertising dollars, by leads generated, or by loan applications generated and closed. Therefore, the choices presented to the borrower may be limited in the number of lender offerings and in the number and quality of mortgage loan products. By way of example, some aggregators may return quotes from three or four mortgage lenders and only provide information on lenders which are paying to participate. In addition, many mortgage lenders, on their own sites or on rate aggregator websites, are providing only a loan program and rate offer with a pre-qualification and not a true loan approval which has been run through a recognized and universally accepted automated underwriting system. Those sites that do offer a true online mortgage approval are often limited in that the approval they offer is based on the results from only one underwriting engine. This approval may be based on the lender's own underwriting engine or on the underwriting systems offered by Fannie Mae or Freddie Mac, but are not the result of multiple automated underwriting systems thus limiting their results by loan type, rate quotes and specific lender.

The business to business mortgage marketplace technology is being used to a significant degree to streamline the approval process and obtain time and cost effectiveness. There are a number of mortgage wholesalers that offer automated underwriting to their mortgage broker clients. In addition, there are some websites that will allow mortgage brokers to connect to online wholesale lender aggregators and obtain a Fannie Mae, Freddie Mac or other proprietary automated underwriting decision. However, this concept has not been extended to the borrower. While these systems encourage price comparison by the mortgage broker or lender, as well as technological efficiencies and price benefits to the mortgage broker or lender, the benefits do not necessarily flow to the borrower.

For those mortgage lenders that offer an actual online mortgage application and approval, these approvals suffer from the drawback that an approval is only valid for a particular mortgage lender and may leave the borrower in a position of weakness in negotiating favorable terms.

SUMMARY OF THE INVENTION

An object of the present invention is to overcome these and other drawbacks in existing systems and methods.

Another object of the invention is to provide a system and process for facilitating universal mortgage underwriting approvals.

Another object of the invention is to provide a system and process for a borrower to apply for and obtain universal multiple mortgage underwriting approvals.

Additional objects and advantages of the invention will be set forth in part in the description, or may be learned by practice of the invention. The objects and advantages of the invention may be realized and attained by means of instrumentalities and combinations particularly pointed out in the appended claims.

To achieve these objects and in accordance with the purpose of the invention, as embodied and broadly described herein, a process for applying for and obtaining universal multiple mortgage lender underwriting approval for an individual comprises the steps of receiving mortgage approval application data from a borrower device, wherein the mortgage approval application data is entered into the borrower device by an individual borrower, creating a plurality of mortgage approval applications comprising the mortgage approval application data, wherein creating the plurality of mortgage approval applications includes formatting a mortgage approval application depending on the requirements of a mortgage underwriting system, forwarding the plurality of mortgage approval applications to a plurality of mortgage underwriting systems, wherein each mortgage underwriting system receives the mortgage approval application in the format required for that mortgage underwriting system, receiving at least one mortgage approval application decision from at least one of the plurality of mortgage underwriting systems, and forwarding the at least one mortgage approval application decision to the borrower device.

According to another embodiment of the invention, a system for applying for and obtaining universal multiple mortgage lender underwriting approval for an individual comprises a receiving device for receiving mortgage approval application data from a borrower device, wherein the mortgage approval application data is entered into the borrower device by an individual borrower, an application creating module for creating a plurality of mortgage approval applications comprising the mortgage approval application data, wherein creating the plurality of mortgage approval applications includes formatting a mortgage approval application depending on the requirements of a mortgage underwriting system, a forwarding module for forwarding the plurality of mortgage approval applications to a plurality of mortgage underwriting systems, wherein each mortgage underwriting system receives the mortgage approval application in the format required for that mortgage underwriting system, a receiving module for receiving at least one mortgage approval application decision from at least one of the plurality of mortgage underwriting systems, and a forwarding device for forwarding the at least one mortgage approval application decision to the borrower device.

The accompanying drawings, which are incorporated in and constitute a part of this specification, illustrate an embodiment of the invention and, together with the description, serve to explain the principles of the invention.

DETAILED DESCRIPTION OF THE PREFERRED EMBODIMENTS

Reference will now be made in detail to the present preferred embodiment of the invention, an example of which is illustrated in the accompanying drawings, in which like reference characters refer to corresponding elements.

In accordance with the present invention a borrower can obtain a universal multiple lender industry recognized and accepted borrower specific automated underwriting approval. The present invention relates to an early stage mortgage process that moves beyond pre-approval or pre-qualification of an online applicant to actually recommending and granting a loan configuration and issuing full universal approval while the borrower is at a multiple underwriter approval website as described in greater detail below. The existence of an automated underwriting engine enables a borrower to use a single mortgage approval application to search and apply for a universal mortgage loan approval for a mortgage loan program against a wide listing of best fit mortgage loan programs. Multiple automated underwriting systems provide the rates and underwriting conditions available for a mortgage loan, enabling a borrower to compare rates and benefit from advances in technology. This online matchmaker model provides an efficient mortgage lending system for the borrower. This invention will allow mortgage borrowers to access a fast loan search engine and provide easy access to multiple underwriting guidelines, while including the ability to apply online, instantly underwrite to multiple underwriting systems, document and fund the loan online.

According to an embodiment of the invention, universal multiple mortgage underwriting approvals (also referred to as "universal approvals") may provide one or more mortgage approval numbers or designations from underwriters. A mortgage approval number or designation may be a file number created by an underwriter and associated with that borrower to identify the underwriting system's evaluation of the borrower. By way of example, Freddie Mac may provide an underwriting result with an accompanying "key number," while Fannie Mae may provide an underwriting review with an accompanying "case number." A universal approval comprising a key number and/or a case number, in addition to approval numbers from a variety of other automated search engines, may enable a borrower to contact various mortgage lenders to formally apply for the widest possible number of mortgage loans. According to another embodiment of the invention, a universal multiple mortgage underwriting approval may combine one mega-approval number assigned to the borrower by a system embodying the present invention. The mega-approval number may be used by mortgage lenders in the same way that approval numbers are used, or may be used in place of approval numbers. The universal approval enables the mortgage lender to process the loan, knowing that the borrower has already been approved by one or more automated underwriters. A borrower may submit the universal approval, whether in the form of one or more mortgage approval numbers, or in the form of a mega-approval number, to a mortgage lender for processing of a mortgage loan. Although the term borrower is used in the context of an individual person seeking to obtain a mortgage loan, it is understood that a borrower may be more than one person seeking a mortgage loan together (e.g., husband and wife, father and daughter, etc.) or may be a business entity seeking a mortgage loan.

Figure 1A:
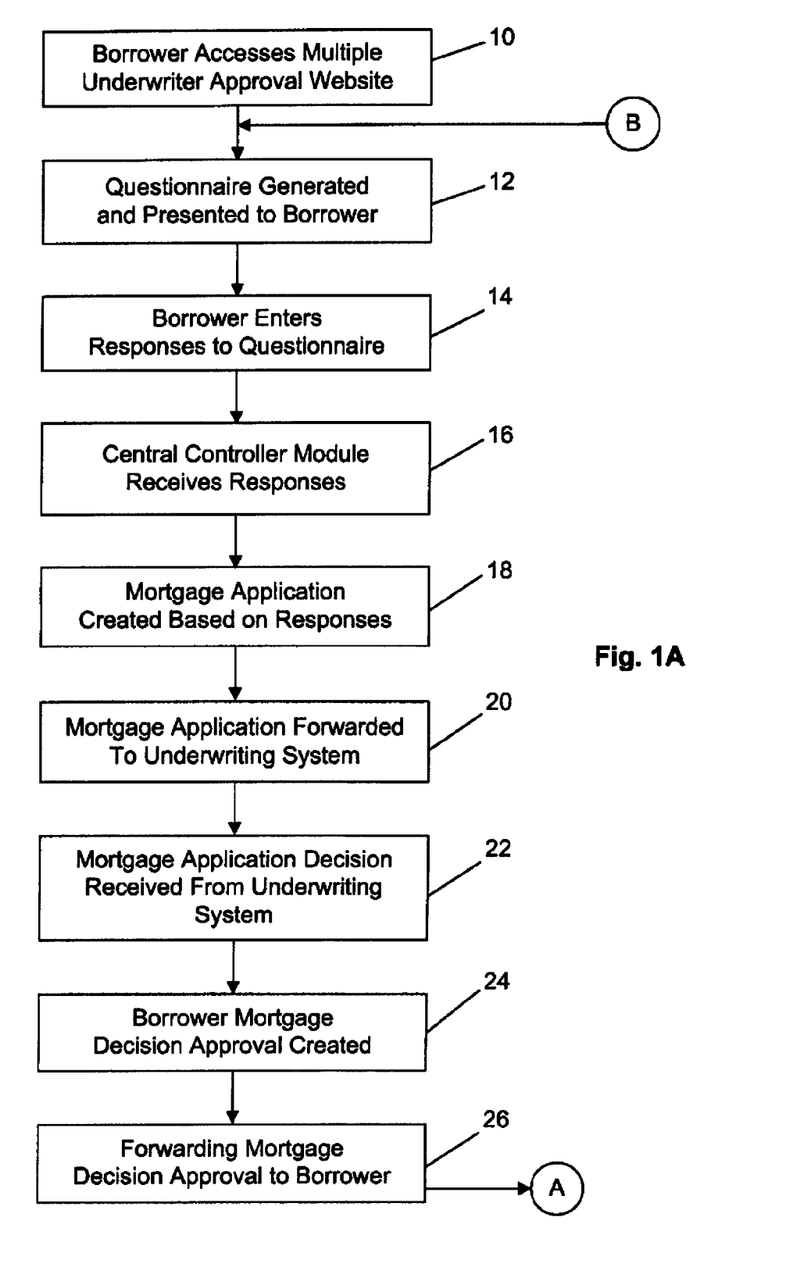
FIGS. 1A and 1B are a flowchart for obtaining universal multiple mortgage underwriting approval according to an embodiment of the invention.
Figure 1B:
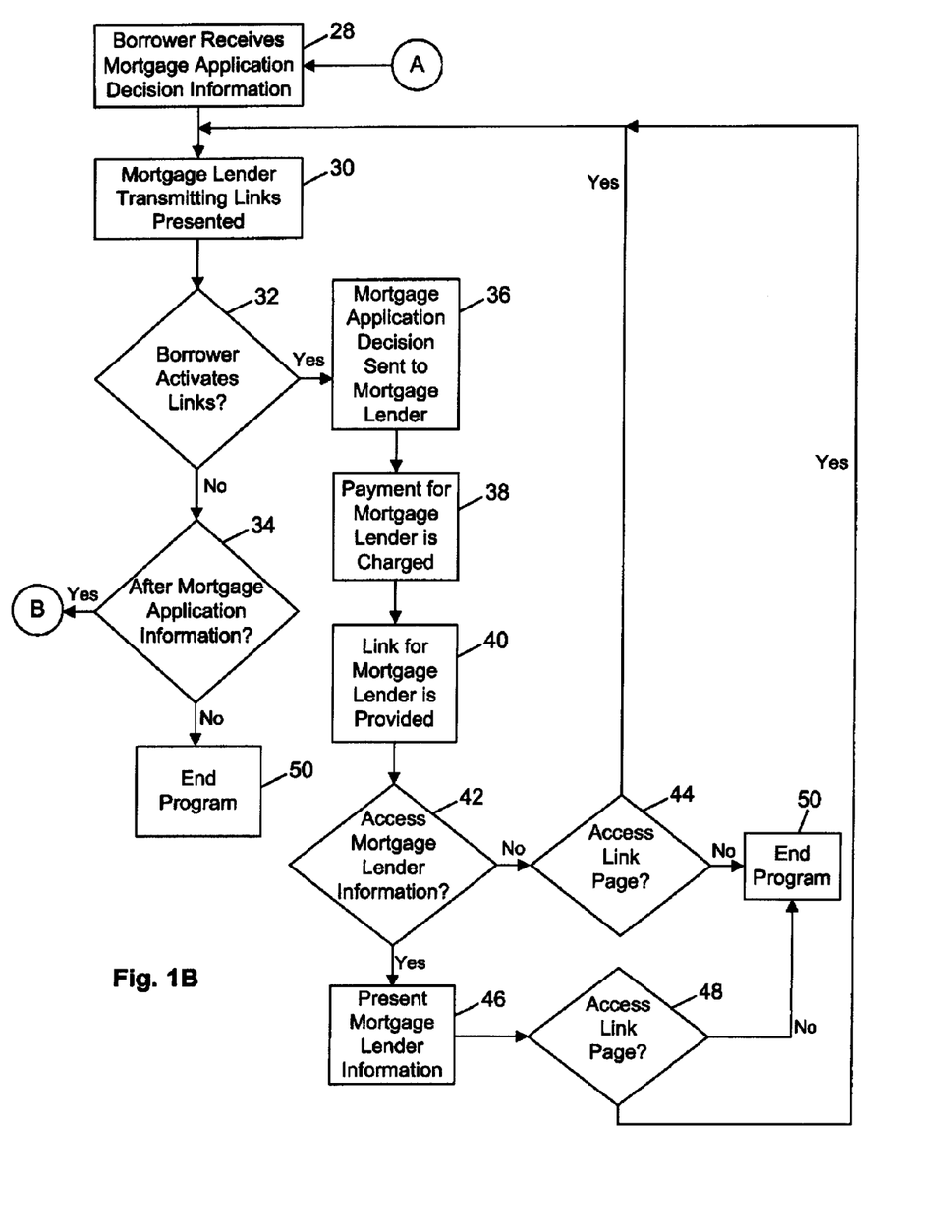

FIGS. 1A and 1B are a flowchart illustrating the steps necessary for obtaining universal multiple mortgage underwriting approval according to an embodiment of the invention. At step 10, a borrower accesses a universal multiple mortgage underwriter approval system, such as a website (or "universal approval website") or interface screen for obtaining universal multiple mortgage underwriter approval. A borrower may access the website via a network connection and system, such as System 100 illustrated in FIG. 4. The borrower navigates through the website in a known manner (e.g., activating various links to move from page to page).

At an appropriate page of the universal approval website, a universal approval function is offered to the borrower. After accessing the mortgage loan approval function, a questionnaire is generated and presented to the borrower at step 12. Central controller 120, described in more detail below, generates a questionnaire with a number of questions. The questions contained in the questionnaire may depend upon the responses to various questions, the location of the borrower, and other factors. By way of example, if a borrower indicates that he/she lives in Kentucky, central controller 120 may generate a set of questions for a questionnaire based on issues, laws and regulations for mortgages in Kentucky. If the borrower indicates that he/she lives in California, different questions may be generated, as the issues, laws, and regulations in California may be different than in Kentucky. Other manners for generating questions for a questionnaire may also be used.

The questionnaire may comprise different types of questions designed to elicit different types of information from a borrower. Certain questions seek information regarding the financial position of the borrower, thereby enabling the automated underwriting engine to determine whether to provide a universal approval for the borrower. These questions may include questions about assets, debt, income, and the like. Other questions may seek information to determine the best mortgage program file for a borrower. These questions may include questions about the expected occupancy of a property, desired periodic payments, and the like. A best fit engine may be used with the questions to determine the best universal approval and/or best rate for a borrower. Other types of questions may also be used.

The borrower enters responses to the questionnaire at step 14. By way of example, a borrower enters responses using a user interface 106 from an end user device 105a-105d, as described in more detail below. By responding to the questionnaire, the borrower provides information for later use in mortgage approval applications to be sent to various underwriter systems.

Figure 2A:
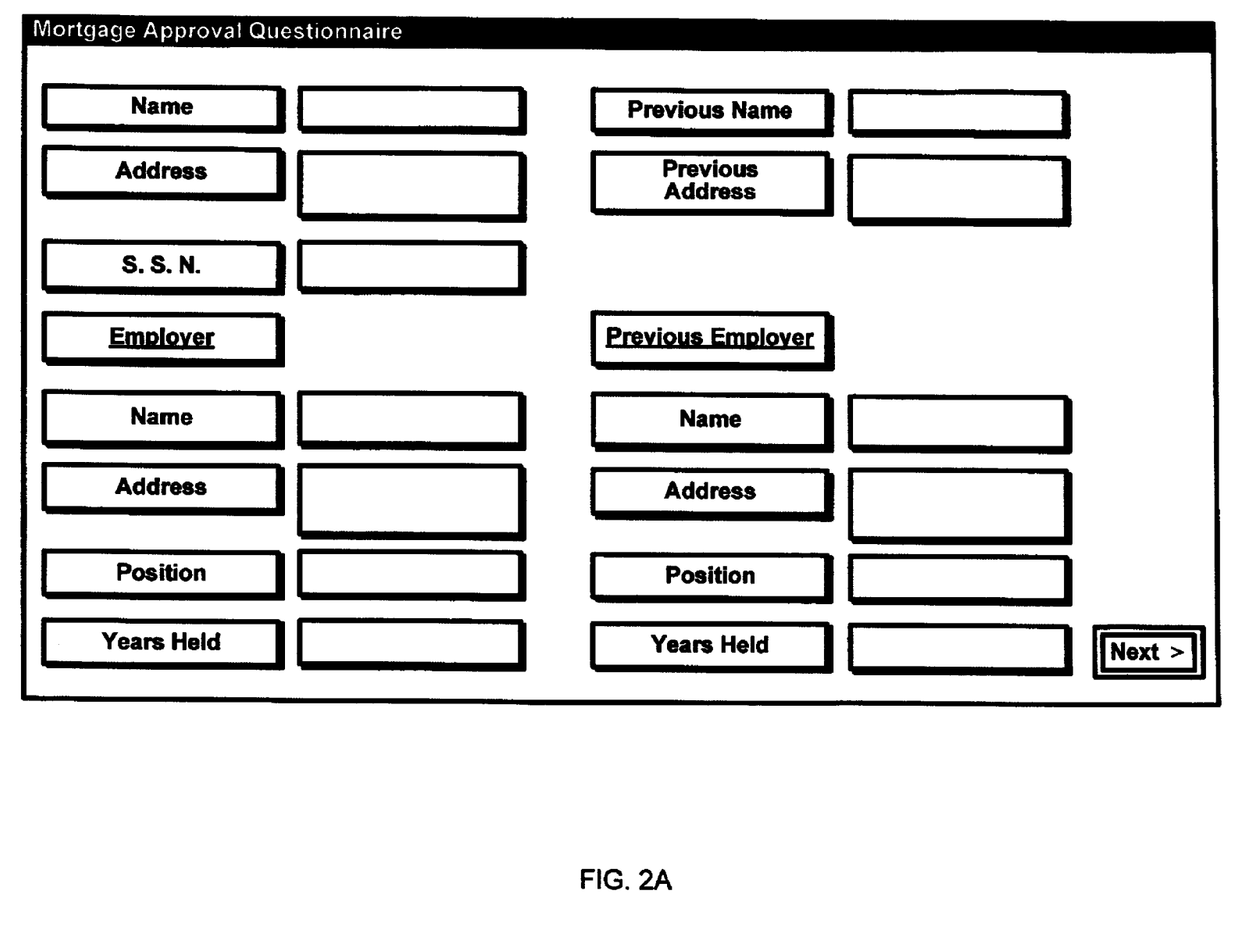
FIGS. 2A-2B are examples of graphical user interfaces for enter information for a mortgage loan approval according to an embodiment of the invention.
Figure 2B:
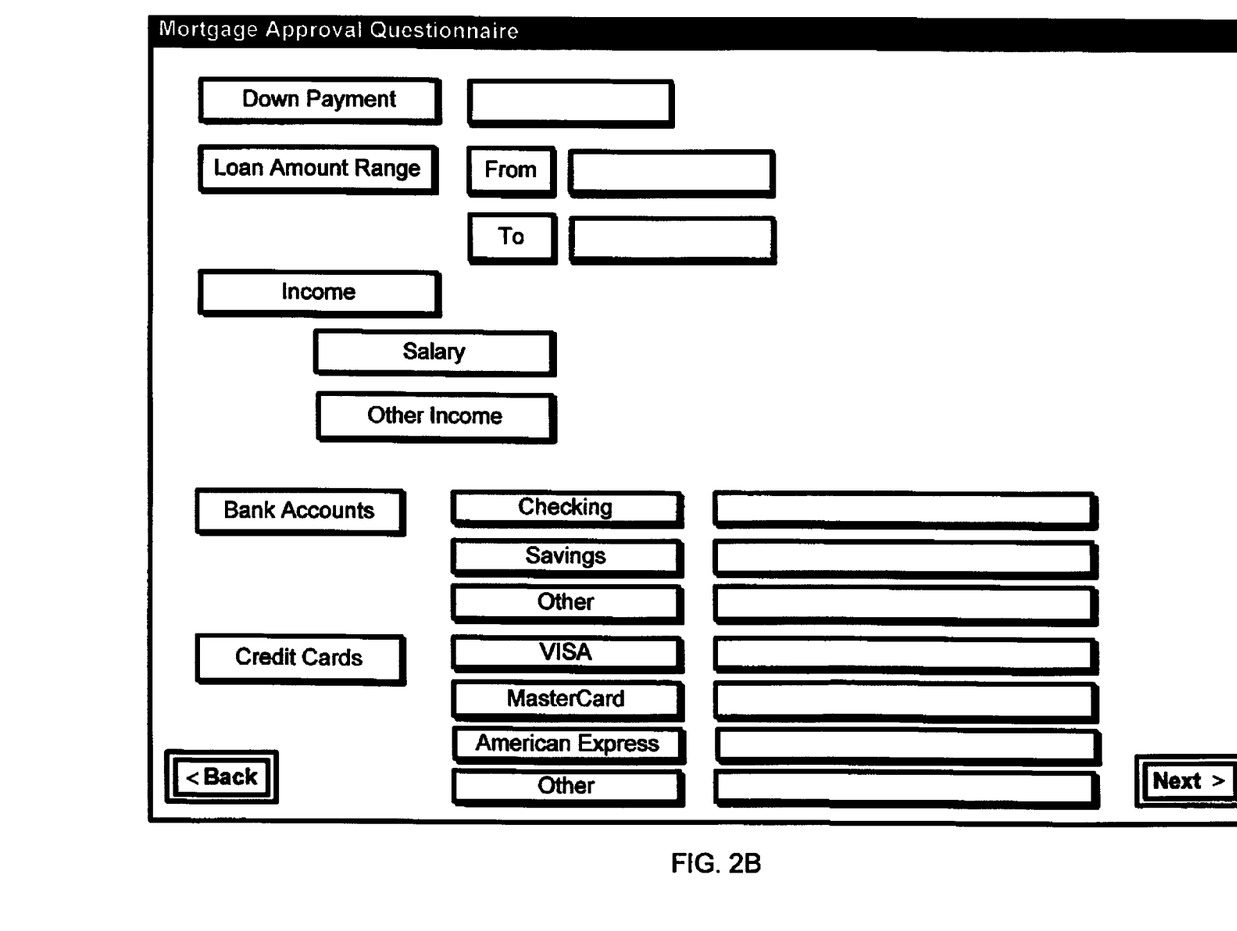
Figure 3:
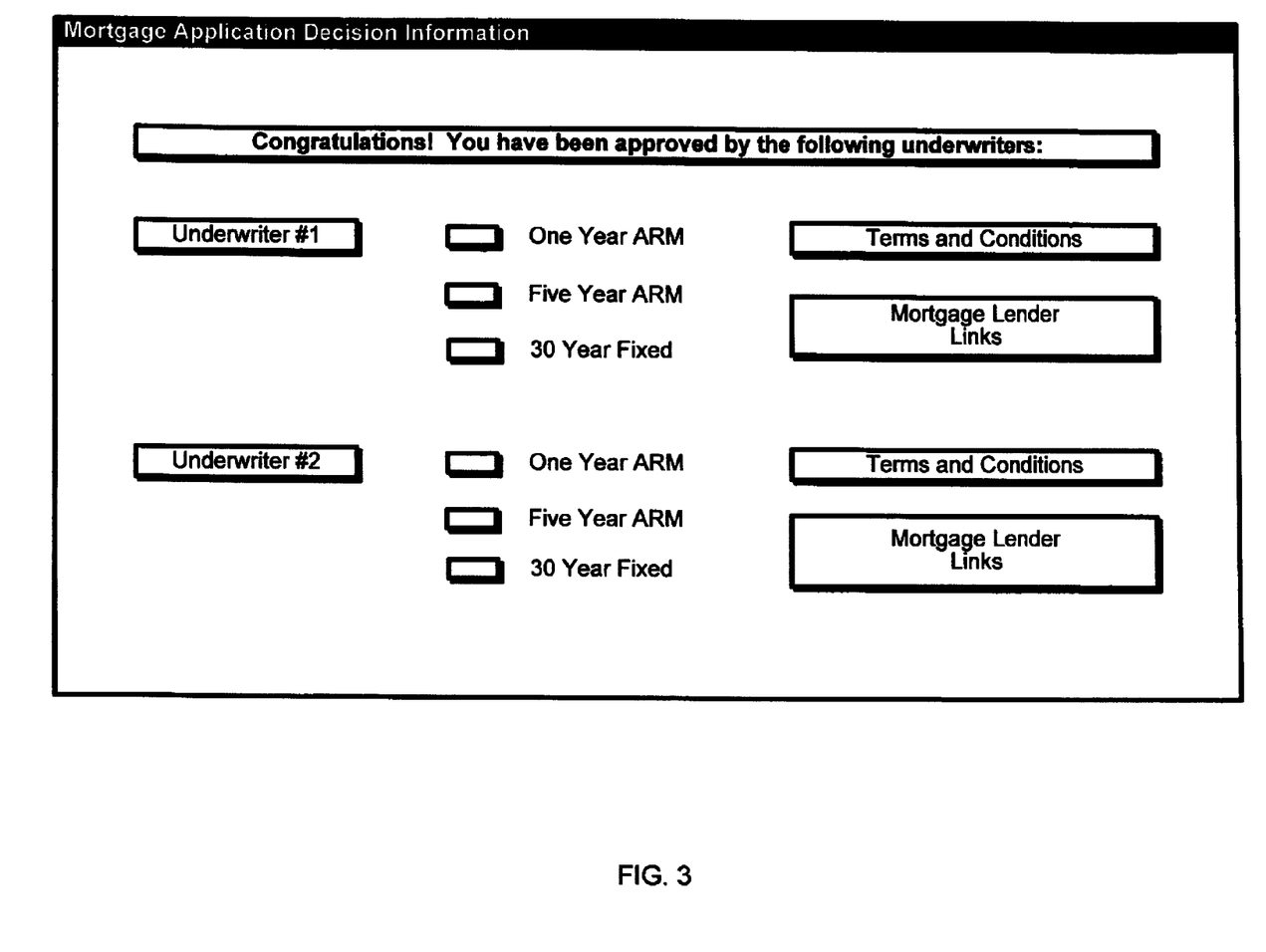
FIG. 3 is an example of graphical user interface for receiving mortgage loan approval information according to an embodiment of the invention.

FIGS. 2A-2C are examples of graphical user interfaces for entering information for a mortgage loan approval according to an embodiment of the invention. FIG. 2A illustrates an example of a graphical user interface page having a first page displaying a questionnaire. A borrower is presented with a number of questions, and spaces to supply the desired information in response to the question. As illustrated in FIG. 2A, a borrower may be asked his/her name, address, social security number, previous name, previous address, employer's name and address, the borrower's occupation, the names and addresses of previous employers, and other information. The graphical user interface may display a "next" icon, where once the borrower has responded to all the questions on the page, the borrower may select the next icon (e.g., activate the next icon via a mouse) to move to the next page.

FIG. 2B illustrates another graphical user interface displaying another page within the questionnaire. Again, the borrower is presented with various questions and spaces to provide the desired information. As illustrated in FIG. 2B, a borrower may be asked the amount of down payment for the home purchase, the range of the loan amount, the borrower's income, including salary and other income sources, borrower bank accounts and credit card accounts, as well as other information. The graphical user interface may include a next icon, as described above, as well as a back icon. At any time, the borrower may select the back icon (e.g., activate the back icon with a mouse) to move back to the previous page. The borrower may then change or review responses on that page.

FIG. 2C illustrates another graphical user interface displaying another page within the questionnaire. As illustrated in FIG. 2C, a borrower is asked questions to enable the system to determine a mortgage loan program which best fits the borrower. The borrower may be asked the amount of down payment he/she has available, how long the property is expected to be owned, the maximum amount of monthly payments the borrower is comfortable with, maximum interest rate desired by the borrower, and other information. The borrower is presented questions and areas on the page to provide the information. As with the pages of FIGS. 2A and 2B, the page displayed on the graphic user interface of FIG. 2C may have a next icon and a back icon to enable the borrower to navigate through the questionnaire.

Once a borrower has provided responses to the questionnaire into an end user device at step 14, the responses are received at central controller module 120 at step 16. Transmitting the responses may be performed in any conventional manner, such as through Network 102 as described more fully below.

Using an application creating module 125, central controller module 120 creates one or more mortgage approval applications at step 18. According to an embodiment of the invention, where each automated underwriter system requires an application in a particular format, the format for each type of mortgage approval application is resident at the central controller module 120. By way of example, the mortgage approval application format may be stored at application creating module 125 or data storage module 135. According to another embodiment of the invention, central controller module 120 may access an underwriting system 140 and retrieve the necessary format for that underwriting systems mortgage approval application. Once the format is accessed, the mortgage approval application is created based on borrower responses to the questionnaire. Data is retrieved from the responses, and organized in the proper format for a mortgage approval application. Any number of mortgage approval applications may be generated. Each of the underwriting systems 140 may be sent an application, or the borrower may select which underwriting systems 140 to send a mortgage approval application. In a preferred embodiment of the invention, a plurality of mortgage approval applications are created, thereby allowing plurality of mortgage approval application decisions to be made by a plurality of underwriting systems 140.

According to another embodiment of the invention, where each automated underwriting system uses an application with the same format or accepts a mortgage approval application in a particular format, that particular accepted format may be resident at central controller module 120. The mortgage approval application is generated as described above.

At step 20, central controller 120 forwards the created mortgage approval application to the appropriate underwriting systems 140. As described in a preferred embodiment of the invention, a plurality of underwriting systems 140 each receive a mortgage approval application created by application creating module 125. Each underwriting system 140 processes the mortgage approval application according to the particular manner of the underwriter system 140. According to an embodiment of the invention, the underwriter system 140 comprises an automated approval decision process.

At step 22, central controller 120 receives a decision from an underwriter system 140 based on the mortgage approval application. A mortgage approval application decision may comprise an outright rejection of a mortgage approval application, or may comprise approval of the mortgage approval application in the form of a universal approval. The universal approval may included a combination of designations or approval numbers, such as key numbers, and/or case numbers, or may comprise a mega-approval number. The terms and conditions for one or more approved mortgage loan programs may also be included. By way of example, if a mortgage approval application is approved by an underwriting system 140, the mortgage approval application decision may include the terms and conditions for a thirty year fixed mortgage, a fifteen year fixed mortgage, a one year adjustable rate mortgage (ARM), a three year ARM and a five year ARM and other mortgage loan programs, as well as approval numbers or designations for each underwriting system. Mortgage approval application decisions may be received from each underwriter system 140 that received a mortgage approval application.

At step 24, a multiple mortgage approval application decision is created by combining the results of each mortgage decision received by central controller module 120. According to an embodiment of the invention, central controller module 120 receives each mortgage approval application decision from all of the underwriter systems 140. Central controller module 120 organizes the mortgage approval application decisions for presentation to the borrower. The decision format may be selected by the borrower. By way of example, the multiple mortgage approval application decision organizes the decisions by underwriting systems 140, where all decisions, such as mortgage loan programs and terms and conditions, from one underwriting system 140 are listed together, while all decisions from another underwriting system 140 are listed together. By way of another example, the multiple mortgage approval application decision is organized by mortgage loan programs, so that all thirty year fixed mortgages are grouped together, all one year ARM's are grouped together, etc. The terms and conditions for each mortgage loan program from an underwriter system 140 may also be included in the multiple mortgage approval application decision. According to an embodiment of the invention, a multiple mortgage approval application decision may include the mortgage lender transmitting links for forwarding mortgage approval application decision information to a mortgage lender, as well as links for accessing information about a particular mortgage lenders, such as via a mortgage lender's website. Other information may also be included in a multiple mortgage approval application decision.

According to another embodiment of the invention, central controller 120 organizes a multiple mortgage approval application based on best mortgage fit answers received from the borrower. Central controller 120, using the best mortgage fit questions, may determine the type of mortgage program that best fits the borrowers needs. By way of example, if a borrower indicates that she plans to live at a home for only six years, central controller 120 may indicate to the borrower that a seven year ARM is the best fit for her situation. A best fit engine may use information provided by a borrower to determine a best fit. A best fit engine may evaluate each mortgage program based on the information received for the borrower, and in turn rank each mortgage program. Rankings may involve ranking each aspect of a mortgage program. Any conventional best fit engine may be used to determine a mortgage program for a borrower. An example of a best fit engine is described in U.S. Pat. No. 5,940,812. Other manners of using a best fit presentation may also be used.

According to another embodiment of the invention, a best rate engine may be used in connection with the system. A best rate engine may search for the best interest rate for a particular mortgage program. A borrower may designate the mortgage program of interest and a best rate engine may present the best rate for that mortgage program. The best rate engine may search, such as search lender and rate aggregator websites. A best rate engine may use any conventional manner for gathering rates.

At step 26, the multiple mortgage approval application decision is forwarded to the borrower, such as from central controller module 120 to end user device 105. At step 28, the borrower accesses the multiple mortgage approval application decision, such as through end user device 105. The borrower may review the information presented in the multiple mortgage approval application decision, including comparing various mortgage loan programs for which the borrower has been approved. A borrower may manipulate a multiple mortgage approval application decision in any conventional manner, including saving the information to a suitable storage medium (e.g., hard drive, optical disk, magnetic disc, etc.) and/or printing the information. The universal approval may then be used to shop for a mortgage loan offline or online as follows. A universal approval, in the form or one or more designations or approval numbers, or a mega-approval number, may be used to obtain a mortgage loan.

At step 30, the borrower is presented with one or more mortgage lender transmitting links for transmitting mortgage approval application decision information to a mortgage lender for processing the mortgage loan. By activating a link, the borrower sends a mortgage approval application decision to the mortgage lender, thereby enabling the mortgage lender to continue the mortgage loan process. According to an embodiment of the invention, the mortgage lender transmitting links are presented with the multiple mortgage approval application decision. Each mortgage approval application decision from an underwriter system 140 may include one or more mortgage lender transmitting links to one or more mortgage lenders. According to another embodiment of the invention, the mortgage lender transmitting links may be separate, but accessible from the multiple mortgage approval application decision. A borrower may move from the page with the multiple mortgage approval application decision to a page with the mortgage lender transmitting links. Other configurations for presenting the multiple mortgage approval application decision and the mortgage lender transmitting links may also be used.

At step 32, a borrower determines whether to activate a mortgage lender transmitting link. If a borrower does not activate a mortgage lender transmitting link, the borrower determines whether to alter information in the questionnaire at step 34. If the borrower decides to alter his/her responses to questions in the questionnaire, the borrower is again presented the questionnaire at step 12. By way of example, a borrower may decide to change the amount of down payment based on the multiple mortgage approval application decision. If the borrower does not want to alter his/her responses to the questionnaire, the borrower may end the program at step 50.

If the borrower selects a mortgage lender transmitting link to activate at step 32, central controller module 120 transmits the applicable mortgage decision information, including the universal approval, to the appropriate mortgage lender at step 36. Thus, one or more mortgage approval numbers or a mega-approval number may be transmitted to a mortgage lender. In selecting a mortgage lender transmitting link to transmit the mortgage approval application decision information, the borrower may also determine what information is transmitted. By way of example, the borrower can select that only mortgage approval application decision information for one mortgage loan program be transmitted to a particular mortgage lender, or the borrower can select to send all mortgage approval application decision information to a particular mortgage lender. Other manners of transmitting information may also be used.

At step 38, central controller module 120 charges a borrower through payment module 130. The amount charged may be a mortgage loan processing fee or other fee charged by a mortgage lender 150 to begin processing a mortgage loan. The amount charged may also be a fee charged by the operator of a system of the present invention for borrowers to use the system for universal mortgage underwriting approval. According to an embodiment of the invention, payment module 130 charges a borrower's credit card for such fees, and forwards the payment to the appropriate mortgage lender. According to another embodiment of the invention, a borrower may have an account set-up, whereby the borrower deposits funds in the account and payment module 130 debits the account at the direction of the borrower. Payment module 130 may keep track of charges to a borrower's account or credit card, and provide a periodic statement of transactions (e.g., daily, weekly, monthly, etc.) to the borrower. Other payment functions may also be performed.

At step 40, central controller module 120 provides a link to information about the mortgage lender. At step 42, the borrower determines whether to access mortgage lender information. Information about the mortgage lender may be accessed through a link to the mortgage lender's website, or through a page located on the multiple mortgage lender underwriter approval website.

If the borrower decides to access mortgage lender information, mortgage lender information is presented at step 46. The borrower is presented information about mortgage lender, including the size of the mortgage lender, other services offered by the mortgage lender. When the borrower has finished reviewing the mortgage lender information, the borrower determines whether to access other mortgage lender transmitting links at step 48. If the borrower does not select to access the other mortgage lender transmitting links, the program ends at step 50. If the borrower does select to access the other mortgage lender transmitting links, these mortgage lender transmitting links are presented to the user at step 30.

If the borrower selects not to access the mortgage lender information from step 42, the borrower determines whether to access other mortgage lender transmitting links at step 44. If the borrower does not select to access the other mortgage lender transmitting links, the program ends at step 50. If the borrower does select to access the other mortgage lender transmitting links, these mortgage lender transmitting links are presented to the user at step 30. Other manners of applying for and obtaining universal multiple mortgage lender underwriting approval may also be used.

The present invention herein described may assist in cutting the mortgage origination and closing process time and costs by reducing the time to search for loan programs, by reducing the time for a mortgage loan to be approved and by reducing the time to loan closing. The invention may facilitate the use of the mortgage loan underwriting and processing tools available to the borrower and the mortgage pricing conduits from a wide variety of third party mortgage services providers. Vendors may now be able to participate at the point of sale, and borrowers and mortgage lenders may search and compare programs and pricing among each of these service providers whether over a network, or by another manner. These tools may also be available to sources not previously considered part of the mortgage origination process such as realtors, accountants, lawyers and others.

According to an embodiment of the invention, the present invention presents borrowers with a table of information with an up-to-date comparison of the rates and fees offered by mortgage lenders offering mortgage loans on a network, such as the Internet or through other manners of application. This technology includes the use of Internet browsers and software programs that automate the information and retrieval tasks relating to the underwriting approval. Borrowers will go to the website and input responses to the questionnaire. Multiple underwriter systems are simultaneously accessed, drastically reducing search times for borrowers. Side-by-side comparisons for all mortgage underwriter systems are displayed, providing the borrower a location where a large search can be accomplished. These features provide cost savings that can be captured by the borrower from the unlimited comparison made available in the search.

A universal approval may reduce the costs of lead generation for a lender, as well as speed the process of ultimately approving the mortgage loan. Lead generation costs may be reduced, as a lender is aware of the status of the borrower and may pursue the borrower in the appropriate manner and using the appropriate resources. A universal approval also eliminates steps in the process that a lender must perform to ultimately issue a mortgage loan. Thus, the universal approval may reduce the time and cost associated with the lenders process. The present invention also provides details regarding automated underwriting systems by revealing the decision making process and results of the various automated underwriting results. In this way, a borrower can be comfortable that he/she has been treated in a fair and reasonable manner. Once a borrower has received a universal approval, the borrower may approach one or more mortgage lenders confident about the terms for the mortgage the borrower will receive. Additionally, mortgage lenders obtain the benefit of starting the mortgage loan process from borrowers already approved by an underwriter system.

Accordingly, the reader will see that the multi-lender automated underwriting approval of this invention can be used by borrowers to obtain the best analysis of all loan programs available in the market. In addition, the multi-lender automated underwriting approval allows the borrower to obtain the widest parameters of a loan approval available, while giving to the borrower the greatest authority and position of power when negotiating with home sellers and lending institutions.

Figure 4:
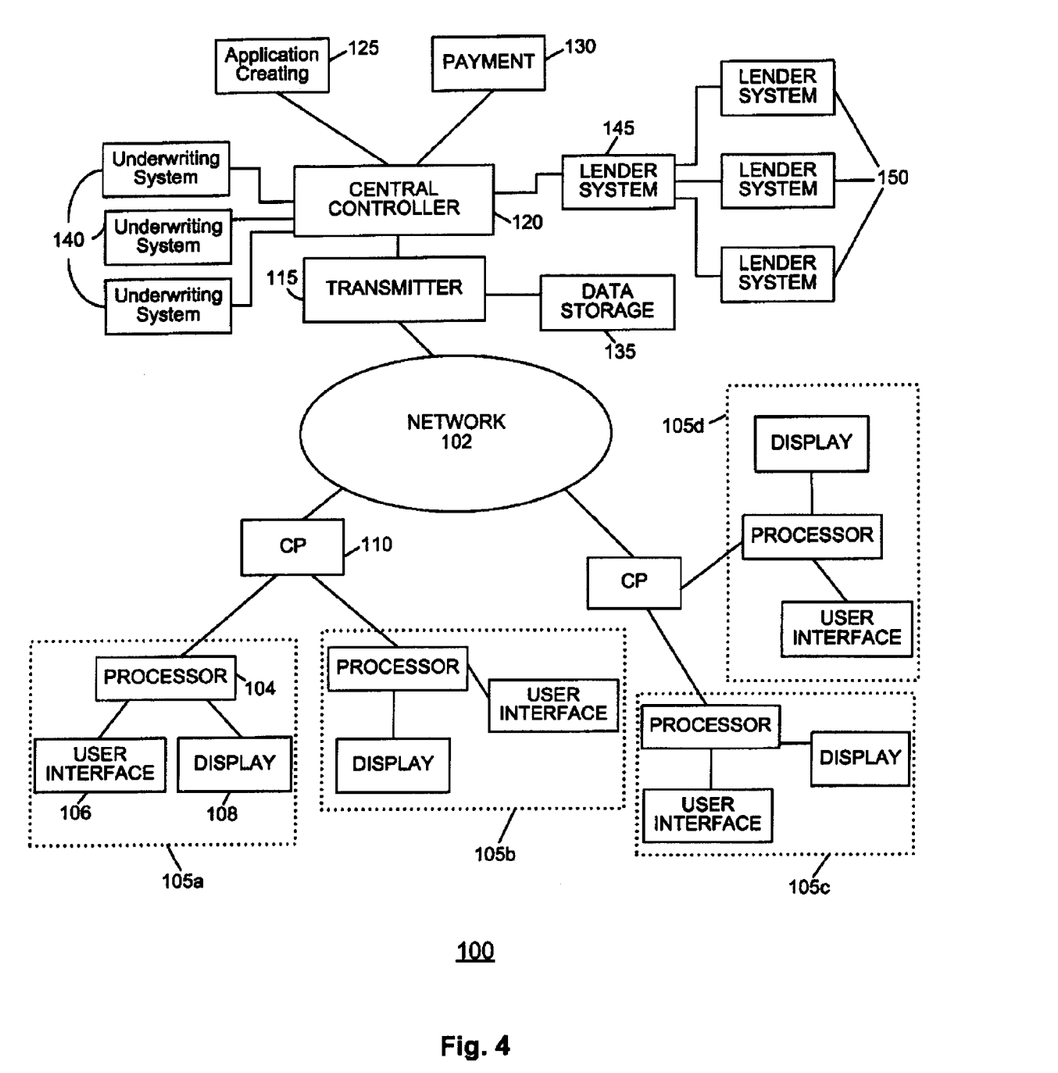
FIG. 4 is a schematic representation of a system for applying for and obtaining universal multiple mortgage underwriting approvals according to an embodiment of the present invention.

FIG. 4 illustrates a System 100 according to an embodiment of the present invention. System 100 comprises multiple end user devices 105a-105d (or "computers") used by borrowers to connect to Network 102 through multiple Connector Providers (CPs) 110. Network 102 may be any network that permits multiple borrowers or computers to connect and interact. According to an embodiment of the invention, Network 102 may be comprised of a dedicated line to connect borrowers, such as the Internet, an intranet, a local area network (LAN), a wide area network (WAN), a wireless network, or other type of network. CP 110 may be a provider that connects the borrowers to the Network 102. For example, CP 110 may be an internet service provider (ISP), a dial-up access means, such as a modem, or other manner of connecting to network 102. In actual practice, there may be significantly more CP's 110 connected to System 100 than shown in FIG. 4. This would mean that there would be additional borrowers which are connected through the same CPs shown or through other CPs. Nevertheless, for purposes of illustration, the discussion will presume four end user devices 105a-105d are connected to Network 102 through two CPs 110.

According to an embodiment of the invention, end user devices 105a-105d may each make use of any device (e.g., computer, wireless telephone, personal digital assistant, etc.) capable of accessing Network 102 through CP 110. Alternatively, some or all of end user devices 105a-105d may access Network 102 through a direct connection, such as a T1 line, or similar connection. FIG. 4 shows four end user devices 105a-105d, each having a connection to Network 102 through a CP 110a and 110b. End user devices 105a-105d may each make use of a personal computer such as a computer located in the borrower's home, or may use other devices which allow the borrower to access and interact with others on Network 102. Central controller module 120 may also have a connection to Network 102 as described above. Central controller module 120 may communicate with one or more data storage modules 135, the latter being discussed in more detail below.

Each computer 105a-105d used by borrowers may contain a processor module 104, a display module 108, and a user interface module 106. Each computer 105a-105d may have at least one user interface module 106 for interacting and controlling the computer. The user interface module 106 may be comprised of one or more of a keyboard, joystick, touchpad, mouse, scanner or any similar device or combination of devices. Each of the computers 105a-105d used by requesters may also include a display module 108, such as a CRT display or other device.

System 100 further includes a central controller module 120. Central controller module 120 may maintain a connection to Network 102 such as through network device 115. Network device 115 may comprise a conventional device which enables central controller module 120 to interact with Network 102. According to an embodiment of the invention, network device 115 may be integral with central controller module 120. The connection to Network 102 by central controller module 120 and computers 105a-105d may be a high speed, large bandwidth connection, such as a though T1 or T3 line, a cable connection, a telephone line connection, DSL connection, or other type connection. Central controller module 120 functions to permit borrower devices 105a-105d to interact with each other in connection with various applications, messaging services and other services which may be provided through System 100.

Central controller module 120 preferably comprises either a single server computer or a plurality of multiple server computers configured to appear to end user devices 105a-105d as a single resource. Central controller module 120 communicates with one or more data storage modules 135. Each data storage module 135 stores various information associated with mortgage lender underwriter approval, including borrower information, mortgage approval application decision information, and other information related to the multiple mortgage lender underwriting approval, as well as information related to the website for a borrower to access and use, including multimedia content, formatting, audio and video components, and other information. According to an embodiment of the invention, a data storage module 135 may be located on one or more data storage devices, where the data storage devices are combined or separate from central controller module 120.

Application creating module 125 performs the function of creating appropriate mortgage approval applications based on mortgage approval application data received from a borrower. Application creating module 125 may use a format required by a particular underwriting system (which may be stored, for example, in data storage module 135) to create an appropriate mortgage approval application. Any number of mortgage approval applications may be created using the mortgage approval application data.

Payment module 130 coordinates necessary payments by borrowers using System 100. According to an embodiment of the invention, when a underwriter approval is forwarded to mortgage lender, the borrower's credit card or account is debited by a predetermined amount for a processing fee. Payment module 130 coordinates the debiting of the appropriate account, including notifying the credit card company, transferring the payment to the mortgage lender, providing statements for borrowers, and other functions related to payment by borrowers.

Central controller module 120 is also connected to multiple underwriter systems 140, thereby enabling central controller module 120 to send and receive information to and from the underwriter systems 140. A mortgage approval application created by application creating module 125 is sent to an appropriate underwriter system 140. Mortgage application decision information is sent from the underwriter systems 140 to central controller module 120. According to the embodiment illustrated in FIG. 4, central controller module 120 is directly connected to each underwriter system 140, such as by a direct line connection. It is understood, however, that other manners for central controller module 120 to connect to an underwriter system 140, such as through Network 102, may also be used.

Lender access module 145 facilitates access to websites of various mortgage lenders 150. According to an embodiment of the invention, a borrower may forward mortgage approval application decision information to one or more mortgage lenders 150. Further, lender access module 145 may enable a borrower access to information about the mortgage lender 150, such as through the mortgage lender's website. According to the embodiment illustrated in FIG. 4, central controller module 120 is directly connected to each mortgage lender 150 through lender access module 145, such as by a direct line connection. It is understood, however, that other manners for connection, such as through Network 102, may also be used.

While System 100 of FIG. 4 discloses a computer 105a-105d connected to Network 102, it is understood that a personal digital assistant ("PDA"), a mobile telephone, a television, or other device that permits access to Network 102 may be used to arrive at the system of the present invention.

According to another embodiment of the invention, a computer-usable and computer-writeable medium having a plurality of computer readable program code stored therein may be provided for practicing the method of the present invention. For example, the computer-usable medium may comprise a CD ROM, a floppy disk, a hard disk, or any other computer-usable medium. One or more of the components of the system may comprise computer readable program code in the form of functional instructions stored in the computer-usable medium such that when the computer-usable medium is installed on a computer system, those components cause the computer system to perform the functions described.

According to one embodiment, central controller module 120, application creating module 125, payment module 130, data storage 135, underwriter system 140, mortgage lender access module 145, mortgage lenders 150, and network device 115 may comprise computer-readable code that, when installed on one or more computers or computer systems, perform the functions described above. Also, only some of the components may be provided in computer-readable code.

According to one specific embodiment of the present invention, a system may comprise components of a software system. The system may operate on a network and may be connected to other systems sharing a common database. Other hardware arrangements may also be provided.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

What is claimed is:

1. A computer-implemented process for applying for and obtaining universal mortgage lender underwriting approval for an individual, the process comprising:
receiving mortgage approval application data from an end user device, wherein the mortgage approval application data is entered into the end user device by a borrower;
creating a plurality of mortgage approval applications comprising the mortgage approval application data, wherein the plurality of mortgage approval applications are created without intervention from the borrower;
bypassing a lender and forwarding the plurality of mortgage approval applications to a plurality of mortgage underwriting systems, wherein each mortgage underwriting system receives at least one of the plurality of mortgage approval applications;
receiving at least one decision from at least one of the plurality of mortgage underwriting systems, the at least one decision based on the mortgage approval application; and
forwarding the at least one decision to the borrower device, wherein the borrower may then present the at least one decision to at least one lender.

2. The process according to claim 1, wherein the step of creating a plurality of mortgage approval applications further comprises formatting each mortgage approval application based on formatting for each mortgage underwriting system; and
wherein the step of forwarding the plurality of mortgage approval applications further comprises forwarding to each mortgage underwriting system the mortgage approval application created in the format for that mortgage underwriting system.

3. The process according to claim 1, wherein the at least one decision comprises a universal approval of a mortgage loan program and terms and conditions of the mortgage loan program.

4. The process according to claim 3, wherein the at least one decision further comprises a decision format selected by the individual, wherein the individual selects at least one of the group of:
a) the terms and conditions from a predetermined underwriting system;
b) a link for connecting the at least one mortgage approval application decision to an appropriate lender; and
c) a link for accessing an appropriate lenders website.

5. The process according to claim 3, wherein the mortgage approval application decision further comprises a universal non-limited mortgage approval.

6. The process according to claim 1, wherein the at least one decision comprises a decision format selected by the individual, wherein the individual selects at least one of the group of:
a) the terms and conditions from a predetermined underwriting system;
b) a link for connecting the at least one mortgage approval application decision to an appropriate lender; and
c) a link for accessing an appropriate lenders website.

7. The process according to claim 1, wherein the mortgage approval application decision further comprises a universal non-limited mortgage approval.

8. The process according to claim 1, further comprising the step of presenting a questionnaire to the individual, wherein the mortgage approval application data received is generated at the end user device in response to the questionnaire.

9. The process according to claim 1, wherein the mortgage approval application decision facilitates obtaining a mortgage loan from a financial lender.

10. A system for applying for and obtaining universal multiple mortgage lender underwriting approval for an individual, the system comprising:
a receiver device for receiving mortgage approval application data from a borrower device, wherein the mortgage approval application data is entered into the borrower device by an individual borrower;
an application creating processor for creating a plurality of mortgage approval applications comprising the mortgage approval application data, wherein the application creating module creates the plurality of mortgage approval applications without intervention from the borrower;
a forwarding processor for bypassing a lender and forwarding the plurality of mortgage approval applications to a plurality of mortgage underwriting systems, wherein each mortgage underwriting system receives at least one of the plurality of mortgage approval applications;

a receiving processor for receiving at least one decision from at least one of the plurality of mortgage underwriting systems, the at least one decision based on the mortgage approval application; and a transmitter forwarding device for forwarding the at least one decision to the borrower device, wherein the borrower may then present the at least one decision to at least one lender.

11. The system according to claim 10, wherein creating a plurality of mortgage approval applications further comprises formatting each mortgage approval application based on the format required by each mortgage underwriting system; and wherein forwarding the plurality of mortgage approval applications further comprises forwarding to each mortgage underwriting system the mortgage approval application created in the format for that mortgage underwriting system.

12. The system according to claim 10, wherein the at least one mortgage approval application decision comprises a universal approval, a mortgage loan program and the terms and conditions of the mortgage loan program.

13. The system according to claim 12, wherein the at least one decision further comprises a decision format selected by the individual, wherein the individual selects at least one of the group of:
  a) the terms and conditions from a predetermined underwriting system;
  b) a link for connecting the at least one mortgage approval application decision to an appropriate lender; and
  c) a link for accessing an appropriate lenders website.

14. The system according to claim 12, wherein the mortgage decision further comprises a universal non-limited mortgage approval.

15. The system according to claim 10, wherein the at least one decision comprises a decision format selected by the individual, wherein the individual selects at least one of the group of:
  a) the terms and conditions from a predetermined underwriting system;
  b) a link for connecting the at least one mortgage approval application decision to an appropriate lender; and
  c) a link for accessing an appropriate lenders website.

16. The system according to claim 10, wherein the mortgage decision further comprises a universal non-limited mortgage approval.

17. The system according to claim 10, further comprising a questions module for presenting a questionnaire to the individual, wherein the mortgage approval application data received is generated at the end user device in response to the questionnaire.

18. The system according to claim 10, wherein the mortgage approval application decision facilitates obtaining a mortgage loan from a financial lender.

19. A computer-implemented process for applying for and obtaining universal mortgage lender underwriting approval for an individual, the process comprising:

receiving mortgage approval application data from an end user device, wherein the mortgage approval application data is entered into the end user device by a borrower;

creating a plurality of mortgage approval applications comprising the mortgage approval application data, wherein the plurality of mortgage approval applications are created without intervention from the borrower;

bypassing a lender and forwarding the plurality of mortgage approval applications to a plurality of mortgage underwriting systems, wherein each mortgage underwriting system receives one of the plurality of mortgage approval applications;

receiving at least one decision from at least one of the plurality of mortgage underwriting systems, wherein the at least one decision is based on the mortgage approval application; and forwarding the at least one decision to the borrower device, wherein the at least one decision comprises at least one universal approval, designation of at least one mortgage loan program, the terms and conditions of the designated at least one mortgage program, and an indication of the best fit mortgage loan program for the borrower, and wherein the borrower may then present the at least one decision to at least one lender.

20. A system for applying for and obtaining universal multiple mortgage lender underwriting approval for an individual, the system comprising:

a receiver device for receiving mortgage approval application data from a borrower device, wherein the mortgage approval application data is entered into the borrower device by an individual borrower;

an application creating processor for creating a plurality of mortgage approval applications comprising the mortgage approval application data wherein creating the plurality of mortgage approval applications includes formatting a mortgage approval application depending on the requirements of a mortgage underwriting system, and wherein the application creating module creates the plurality of mortgage approval applications without intervention from the borrower;

a forwarding processor for bypassing a lender and forwarding the plurality of mortgage approval applications to a plurality of mortgage underwriting systems, wherein each mortgage underwriting system receives the mortgage approval application created in the format required for that mortgage underwriting system;

a receiving processor for receiving at least one decision from at least one of the plurality of mortgage underwriting systems based on the mortgage approval application; and a transmitting device for forwarding the at least one decision to the borrower device, wherein the decision comprises at least one universal approval, designation of at least one mortgage loan program, the terms and conditions of the designated at least one mortgage program, and an indication of the best fit mortgage loan program for the borrower, and wherein the borrower may then present the at least one decision to at least one lender.

* * * * *